United States Patent
Scott (10) Patent No.: US 6,512,773 B1
(45) Date of Patent: Jan. 28, 2003

(54) SYSTEM AND METHOD FOR TRANSPORTING INFORMATION OVER A COMMUNICATION CHANNEL

(75) Inventor: Robert E. Scott, Largo, FL (US)

(73) Assignee: Paradyne Corporation, Largo, FL (US)

(*) Notice: Subject to any disclaimer, the term of this patent is extended or adjusted under 35 U.S.C. 154(b) by 0 days.

(21) Appl. No.: 09/223,089

(22) Filed: Dec. 30, 1998

Related U.S. Application Data (60) Provisional application No. 60/070,041, filed on Dec. 30, 1997.

(51) Int. Cl.[7] ............. H04L 12/28; H04L 12/56
(52) U.S. Cl. ............. 370/395.61; 370/395.1; 370/395.5; 370/395.6; 370/389
(58) Field of Search ............ 370/395.1, 399, 370/397, 395.61, 395.63, 395.65, 409, 419, 474, 476, 352, 389, 395.5, 395.6

(56) References Cited

U.S. PATENT DOCUMENTS

| | | | | |
|---|---|---|---|---|
| 4,872,157 A | * | 10/1989 | Hemmady et al. | 370/400 |
| 4,970,721 A | * | 11/1990 | Aczel et al. | 370/355 |
| 5,446,726 A | * | 8/1995 | Rostoker et al. | 370/232 |
| 5,459,723 A | * | 10/1995 | Thor | 370/392 |
| 6,141,339 A | * | 10/2000 | Kaplan et al. | 370/352 |

* cited by examiner

Primary Examiner—Wellington Chin
Assistant Examiner—William Schultz
(74) Attorney, Agent, or Firm—Thomas, Kayden, Horstemeyer & Risley

(57) ABSTRACT

An improved system and method for transporting ATM information over a communications channel by enabling a single 4-octet ATM header to be prepended to user data, thus forming a low overhead ATM cell. Furthermore, an alternative embodiment of the invention may be used to simultaneously transport a plurality of 52 octet ATM frames in conjunction with the low overhead cells.

16 Claims, 9 Drawing Sheets

Fig. 5C

SYSTEM AND METHOD FOR TRANSPORTING INFORMATION OVER A COMMUNICATION CHANNEL

CROSS-REFERENCE TO RELATED APPLICATIONS

This document claims priority to and the benefit of the filing date of Provisional Application Serial No. 60/070,041 entitled LOW OVERHEAD ATM IN AN XDSL SYSTEM, filed Dec. 30, 1997, which is hereby incorporated by reference.

TECHNICAL FIELD

The present invention relates generally to communication systems, and more particularly, to an improved system and method for transporting asynchronous transfer mode (ATM) information over a communications channel such as a digital subscriber line (DSL).

BACKGROUND OF THE INVENTION

Data communication typically occurs as the transfer of information from one communication device to another. This is typically accomplished by the use of a modem located at each communication endpoint. In the past, the term modem denoted a piece of communication apparatus that performed a modulation and demodulation function, hence the term "modem". Today, the term modem is typically used to denote any piece of communication apparatus that enables the transfer of data and voice information from one location to another. For example, modem communication systems use many different technologies to perform the transfer of information from one location to another. Digital subscriber line (DSL) technology is one vehicle for such transfer of information. DSL technology uses the widely available subscriber loop, the copper wire pair that extends from a telephone company central office to a residential location, over which communication services may be provisioned. DSL devices can be referred to as modems, or, more accurately, transceivers, which connect the telephone company central office to the user, or remote location typically referred to as the customer premises. The transport of communication over a DSL communication channel generally consists of a physical layer modulation over which asynchronous transfer mode (ATM) communication occurs. ATM is typically achieved through the transport of packets of information referred to as "cells". An ATM cell is 53 octets in length, an octet consisting of one byte of information. DSL technology encompasses many varieties of modulation techniques over the subscriber loop including, but not limited to, carrierless amplitude modulation (CAP), quadrature amplitude modulation (QAM) and variations thereof, etc.

ATM offers the advantages of a connection based architecture and efficient processing in the core network switches. The core network switches are those devices that comprise the network over which a plurality of telephone company central offices may communicate. This network is sometimes referred to as a "backend" network.

The small, fixed size of an ATM cell can also provide low latency for real-time data transfer. ATM cells however, also require additional processing at an endpoint, or remote, transceiver device, thus giving rise to additional cost and complexity required at a remote device. Furthermore, ATM cells require a large amount of overhead, thus reducing the user data throughput over the DSL communication channel.

In the past, ATM cells were communicated over a DSL communication channel, thus tolerating the excessive overhead for the ability to transport ATM over the DSL communication channel and, in turn, over the backend network.

One possible solution to the problem of transporting ATM over a DSL communication channel was developed in the form of framed user network interface (FUNI). FUNI created frames within which ATM information may be transported over a DSL communication channel. FUNI has a number of disadvantages however. For example, the communication header associated with FUNI differs significantly from the standard five octet ATM cell header. Significant processing resources are expended in converting the FUNI header to an ATM cell. Also, FUNI may only transport AAL5 (ATM adaptation layer 5) frames. There is no other method to transport other AAL types. The basic purpose of the AAL layers is to isolate the higher communication layers from the specific characteristics of the ATM layer by mapping the higher layer protocol data units (PDU's) into the information field of the ATM cell and vice versa.

Furthermore, FUNI does not allow the transport of real-time applications, such as telephone communication, and FUNI does not allow support for ABR (available bit rate) data because FUNI fails to provide for RM (resource management) cells, which are indicated by a special bit combination in the PTI (payload type indicator) of the cell header.

Thus, a heretofore unaddressed need exists in the industry to address the aforementioned deficiencies and inadequacies in the transport of ATM information over a DSL communication channel.

SUMMARY OF THE INVENTION

The present invention provides an improved system and method for communicating over a digital subscriber line.

The system of the present invention uses a novel header application which enables the transport of ATM data efficiently and economically over a communications channel, such as a DSL communications channel.

Briefly described, in architecture, the system can be implemented as follows. An improved system for communicating over a digital subscriber line, comprises means for forming a data frame, the data frame comprising a header; a trailer, a first frame delimiter and a second frame delimiter, the frame delimiters encompassing a plurality of fields, and means for forming a payload, the payload comprising the first four octets of a five octet Asynchronous Transfer Mode (ATM) header combined with user data. Alternatively, the payload may comprise at least one 52 octet ATM cell. The header also includes means for indicating whether the payload comprises the first four octets of a five octet Asynchronous Transfer Mode (ATM) header combined with user data, or whether the payload comprises the 52 octet ATM cells.

The present invention can also be viewed as providing an improved method for communicating information over a digital subscriber line. In this regard, the method can be broadly summarized by the following steps: forming a data frame, the data frame comprising a header, a trailer, a first frame delimiter and a second frame delimiter, the frame delimiters encompassing a plurality of fields, and forming a payload, the payload comprising the first four octets of a five octet Asynchronous Transfer Mode (ATM) header combined with user data. Alternatively, the payload may comprise at least one 52 octet ATM cell. The method also includes the step of determining whether the payload comprises the first four octets of a five octet Asynchronous Transfer Mode (ATM) header combined with user data, or whether the payload comprises the 52 octet ATM cells.

The present invention has numerous advantages, a few of which are delineated hereafter as merely examples.

An advantage of the invention is that the overhead of a communication channel is reduced, thus allowing higher throughputs of data.

Another advantage of the invention is that a number of processing tasks are moved to a central communications device. This results in reduced cost as compared to performing these processing tasks in the remote communications device.

Another advantage of the invention is that it supports the communication of all ATM adaptation layer (AAL) information.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

The improved system and method for transporting information over a communication channel can be implemented in hardware, software, firmware, or a combination thereof. In the preferred embodiment(s), the improved system and method for transporting information over a communication channel is implemented in software that is stored in a memory and that is executed by a suitable instruction execution system.

Figure 5A:
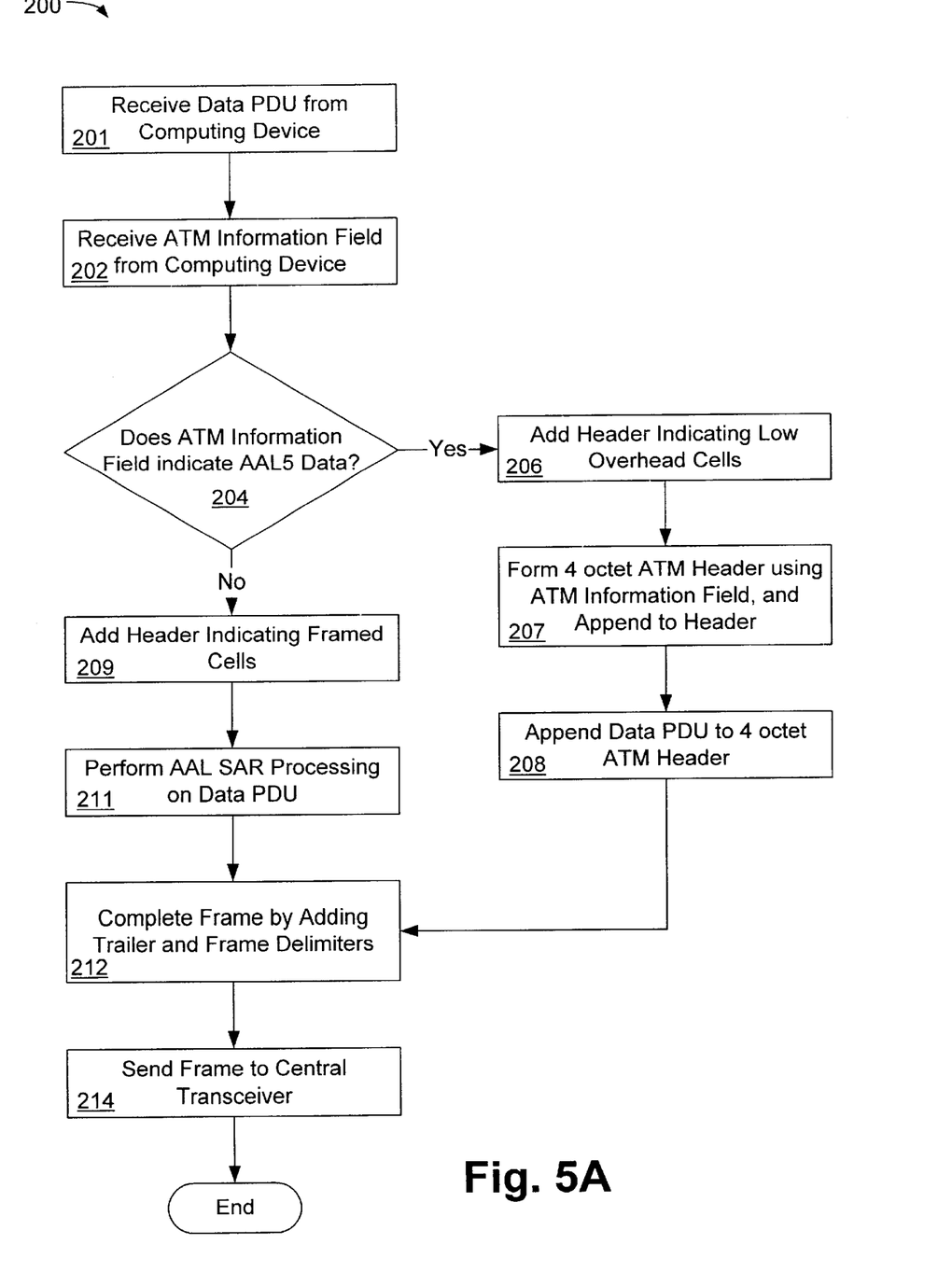
FIG. 5A is a flow chart illustrating the steps performed at the remote transceiver to implement the present invention.
Figure 5B:
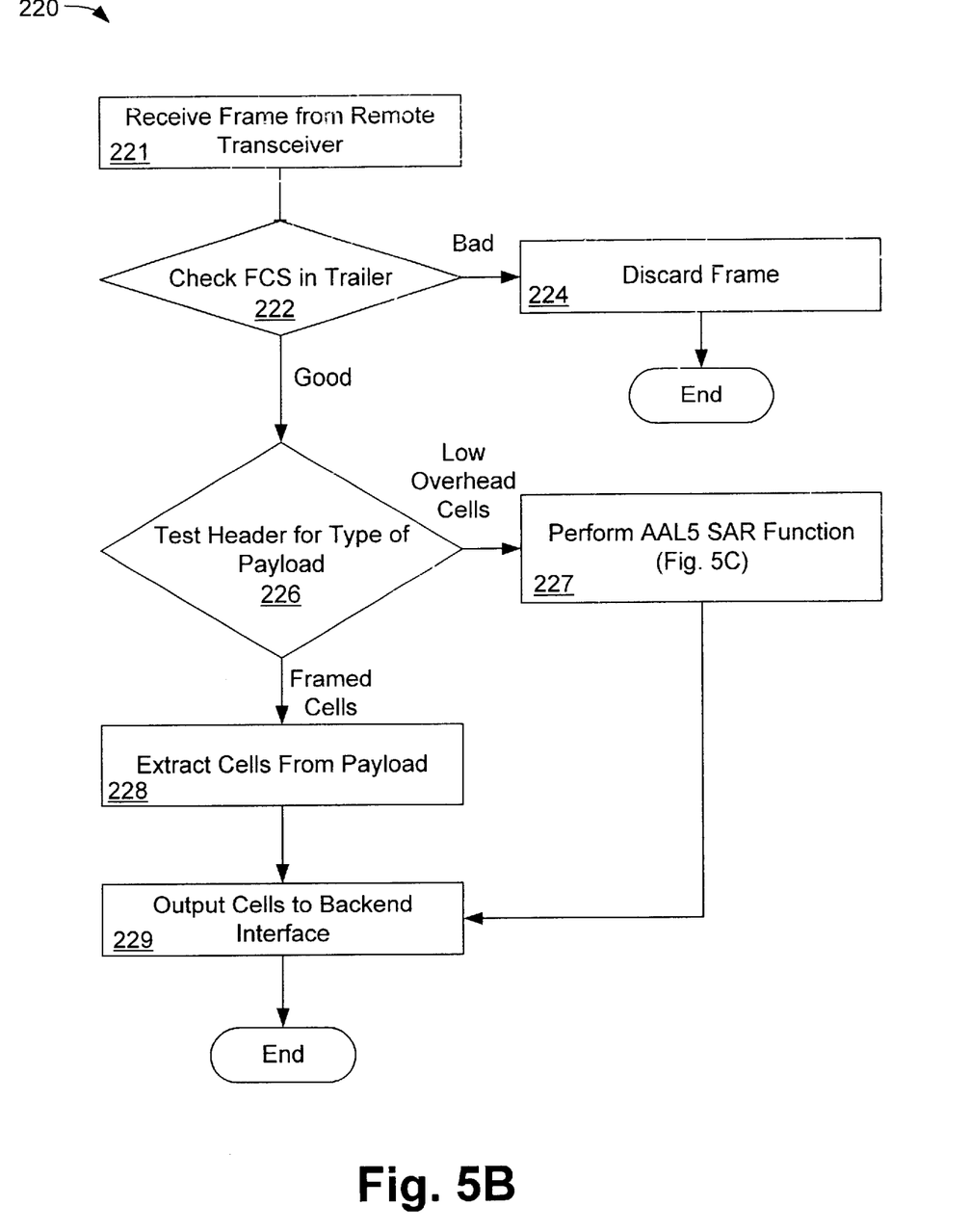
FIG. 5B is a flow chart illustrating the steps performed at the central transceiver to implement the present invention.
Figure 5C:
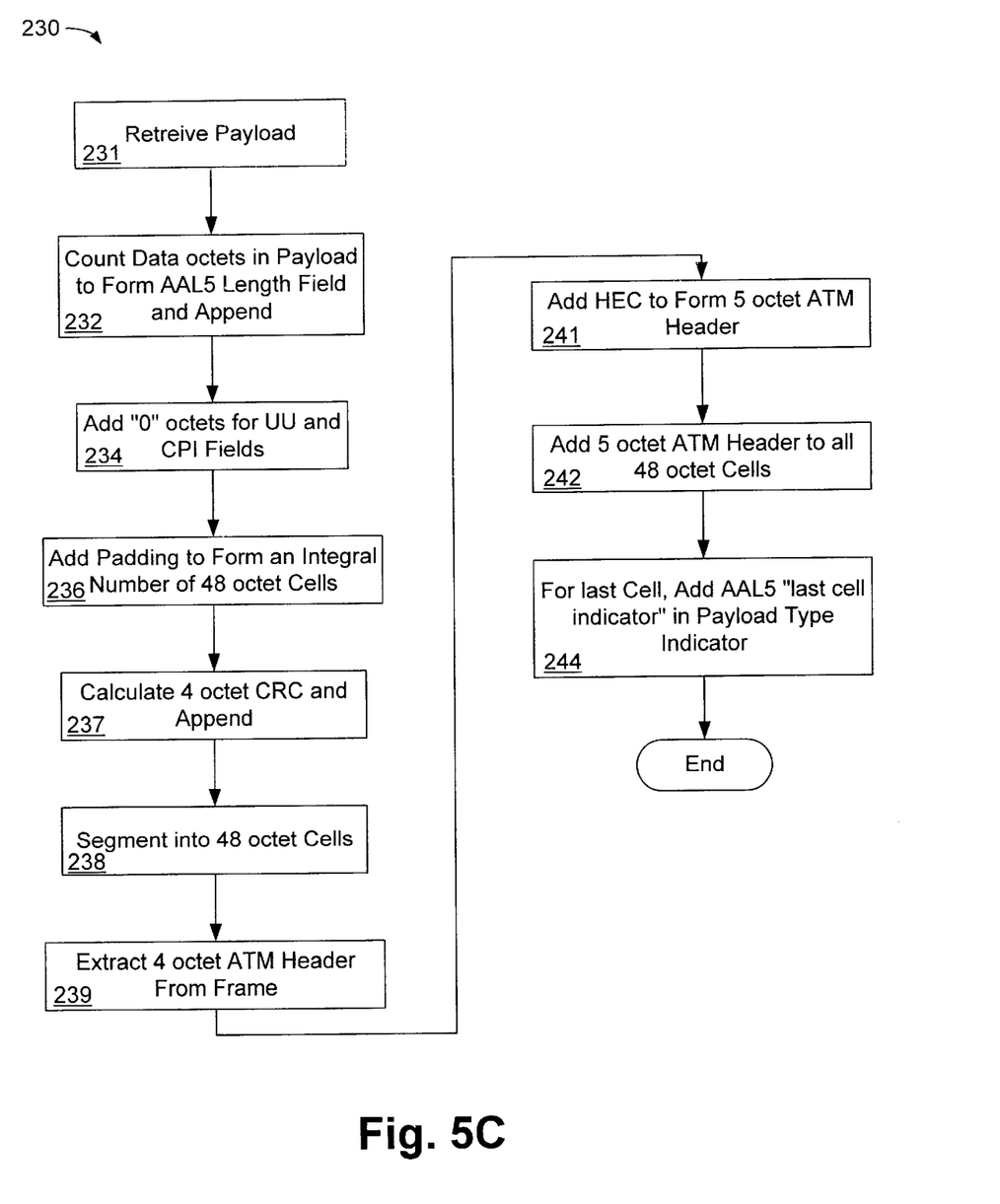
FIG. 5C is a flow chart illustrating the steps performed at the central transceiver to implement the SAR process of the present invention.

The flow chart of FIGS. 5A, 5B and 5C illustrate the functionality and operation of a possible implementation of the improved method for communicating over a digital subscriber line. In this regard, each block represents a module, segment, or portion of code, which comprises one or more executable instructions for implementing the specified logical function(s). It should also be noted that in some alternative implementations, the functions noted in the blocks may occur out of the order noted in FIGS. 5A, 5B and 5C. For example, two blocks shown in succession in FIGS. 5A, 5B and 5C may in fact be executed substantially concurrently or the blocks may sometimes be executed in the reverse order, depending upon the functionality involved, as will be further clarified hereinbelow.

The improved system and method for transporting information over a communication channel program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc readonly memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Furthermore, while illustrated using a single remote transceiver, the improved system and method for transporting information over a communication channel may be implemented using a plurality of remote transceivers.

Prior to discussing the present invention, a brief discussion regarding the Open Systems Interconnect (OSI) 7-layer model will be helpful as in the discussion to follow, the terms layer 1 and layer 2 will be used. In 1978, a framework of international standards for computer network architecture known as OSI (Open Systems Interconnect) was developed. The OSI reference model of network architecture consists of seven layers. From the lowest to the highest, the layers are: (1) the physical layer; (2) the datalink layer; (3) the network layer; (4) the transport layer; (5) the session layer; (6) the presentation layer; and (7) the application layer. Each layer uses the layer below it to provide a service to the layer above it. The lower layers are implemented by lower level protocols which define the electrical and physical standards, perform the byte ordering of the data, and govern the transmission, and error detection and correction of the bit stream. The higher layers are implemented by higher level protocols which deal with, inter alia, data formatting, terminal-to-computer dialogue, character sets, and sequencing of messages.

Layer 1, the physical layer, generally controls the direct host-to-host communication between the hardware of the end users' data terminal equipment (e.g., a modem connected to a PC).

Layer 2, the datalink layer, generally fragments the data to prepare it to be sent on the physical layer, receives acknowledgment frames, performs error checking, and re-transmits frames which have been incorrectly received. In most modern systems, this layer performs error checking and discard of frames in error, but frame re-transmissions are handled at a higher layer.

Layer 3, the network layer, generally controls the routing of packets of data from the sender to the receiver via the datalink layer, and it is used by the transport layer. An example of the network layer is Internet Protocol (IP) which is the network layer for the widely used TCP/IP protocol.

Layer 4, the transport layer, generally determines how the network layer should be used to provide a point-to-point, virtual, error-free connection so that the end point devices send and receive uncorrupted messages in the correct order. This layer establishes and dissolves connections between hosts. It is used by the session layer. TCP is an example of the transport layer.

Layer 5, the session layer, uses the transport layer and is used by the presentation layer. The session layer establishes a connection between processes on different hosts. It handles the creation of sessions between hosts as well as security issues.

Layer 6, the presentation layer, attempts to minimize the noticeability of differences between hosts and performs functions such as text compression, and format and code conversion.

Layer 7, the application layer, is used by the presentation layer to provide the user with a localized representation of data which is independent of the format used on the network. The application layer is concerned with the user's view of the network and generally deals with resource allocation, network transparency and problem partitioning.

Figure 1:
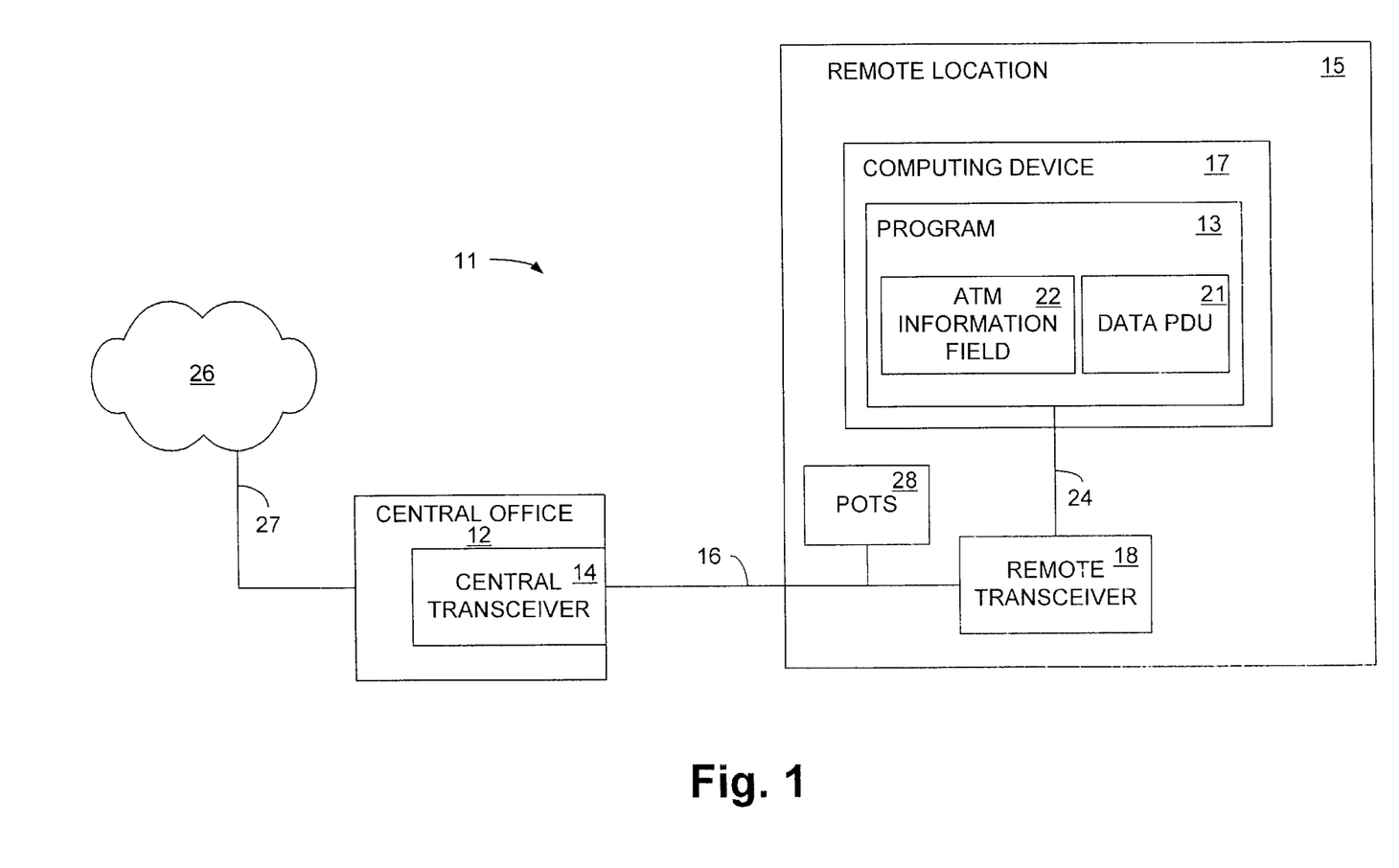
FIG. 1 is a schematic view illustrating the communication system topography in which the present invention operates.

Turning now to FIG. 1, shown is a schematic view illustrating the communication system topography in which the present invention operates.

Communications system 11 includes central office 12 and remote location 15 connected via subscriber line 16, and also includes backend network 26 connected to central office 12 via backend interface 27. Subscriber line 16 is illustratively the copper wire pair, that extends between a telephone company's central office and a customer premises or small business location, and is typically referred to as the local loop. Digital subscriber line (DSL) services are typically provisioned over subscriber line 16. Also located at central office location 12 is central transceiver 14. Central transceiver 14 connects to subscriber line 16 and communicates with remote transceiver 18 using any of a plurality of modulation schemes. Alternatively, central transceiver 14 may be located in a digital loop carrier (DLC) system remote from a central office, however, all the functionality described herein with respect to central transceiver applies to a central transceiver located in a DLC system.

Typically, asynchronous transfer mode (ATM) communication takes place over subscriber line 16. Central transceiver 14 connects over subscriber line 16 to one or a plurality of remote transceivers located at remote location 15. Remote location 15 may be for example, a customer residential location or a business location. Illustratively, remote location 15 also includes computing device 17, which is illustratively used by a user to communicate with backend network 26.

Computing device 17 may be, for example, a personal computer used to communicate over the Internet. Computing device 17 executes program 13, which may be an application program, and/or may be a software "driver". Program 13 generally includes ATM information field 22 and data PDU (protocol data unit) 21. An example of a data PDU 21 is a PPP (point-to-point protocol) frame. Data PDU 21 is typically the information that computing device 17 communicates over subscriber line 16 and backend interface 27 through remote transceiver 18 and central transceiver 14 to backend network 26. Backend network 26 is generally the network that connects a plurality of central office locations and over which data is communicated between remote location 15 and another destination.

ATM information field 22 generally consists of at least the ATM VPI (virtual path indicator) and the ATM VCI (virtual circuit indicator) of the ATM VC (virtual circuit), which information is used to define the ATM path between computing device 17 and central transceiver 14. Other information may also be included within ATM information field 22, such as the PTI (payload type indicator), the AAL (ATM adaptation layer) type, etc.

The ATM AAL generally isolates the higher layers of the communication protocol from the specific characteristics of the ATM layer by mapping the higher layer protocol data units into the information field of the ATM cell and vice versa. The AAL is also sublayered. To support services above the AAL, some independent functions are required of the AAL. These functions are organized in two logical sublayers: the convergence sublayer (CS) and the segmentation and reassembly sublayer (SAR). The general functions of these sublayers are as follows.

The SAR sublayer functions to segment the higher layer information into a size suitable for the information field of an ATM cell, and to reassemble the contents of ATM cell information fields into higher layer information. The SAR functionality is typically performed by a remote transceiver 18. The CS sublayer provides the AAL service at the AAL-SAP (service access point) identifier.

A plurality of AAL sublayer classifications are possible based upon the following parameters. Timing relation between source and destination (referring to the urgency of the traffic) required or not required. Whether the bit rate is constant or variable, and the connection mode, that is, whether connection-oriented or connectionless. Typically, a plurality of AAL types are provided between computing device 17 and central office 12, which correspond to a plurality of classes of service. For example, constant bit rate (CBR) services such as uncompressed voice or video, real-time variable bit rate (rt-VBR) services such as compressed voice and video, and "best effort" undefined bit rate (UBR) data services.

The AAL types may correspond to the service classes as follows: AAL type 1 corresponds to CBR, AAL type 2 corresponds to rt-VBR, and AAL type 5 corresponds to UBR. Note that these examples are illustrative—AAL type 5 may be used to carry CBR and rt-VBR, for example. The foregoing discussion was included to illustrate the AAL sublayer information and will be described in detail with respect to FIG. 2.

Remote location 15 also may include standard POTS device 28, which is illustratively a conventional telephone and is connected directly to subscriber line 16.

Program 13 transfers the ATM information field 22 and the data PDU 21 to remote transceiver 18 over interface 24. Interface 24 may be, for example but not limited to, a universal serial bus (USB) interface, an Ethernet interface, or an IEEE (Institute of Electrical and Electronic Engineers) 1394 interface. Interface 24 may also be an interface internal to computing device 17, such as ISA (industry standard architecture) or PCI (peripheral communications interface.) Program 13 is generally written for the specific type interface 24. Examples of program 13 are BMAP (broadband modem access protocol, as described in asymmetric digital subscriber line (ADSL) Forum documents) for an Ethernet interface, and USB CDC (communications device class) driver for the USB interface. While all of these programs facilitate the transfer of data PDU 21 and ATM information field 22, they may also contain other information, such as MAC (medium access control) source address and destination address, etc.

Figure 2:
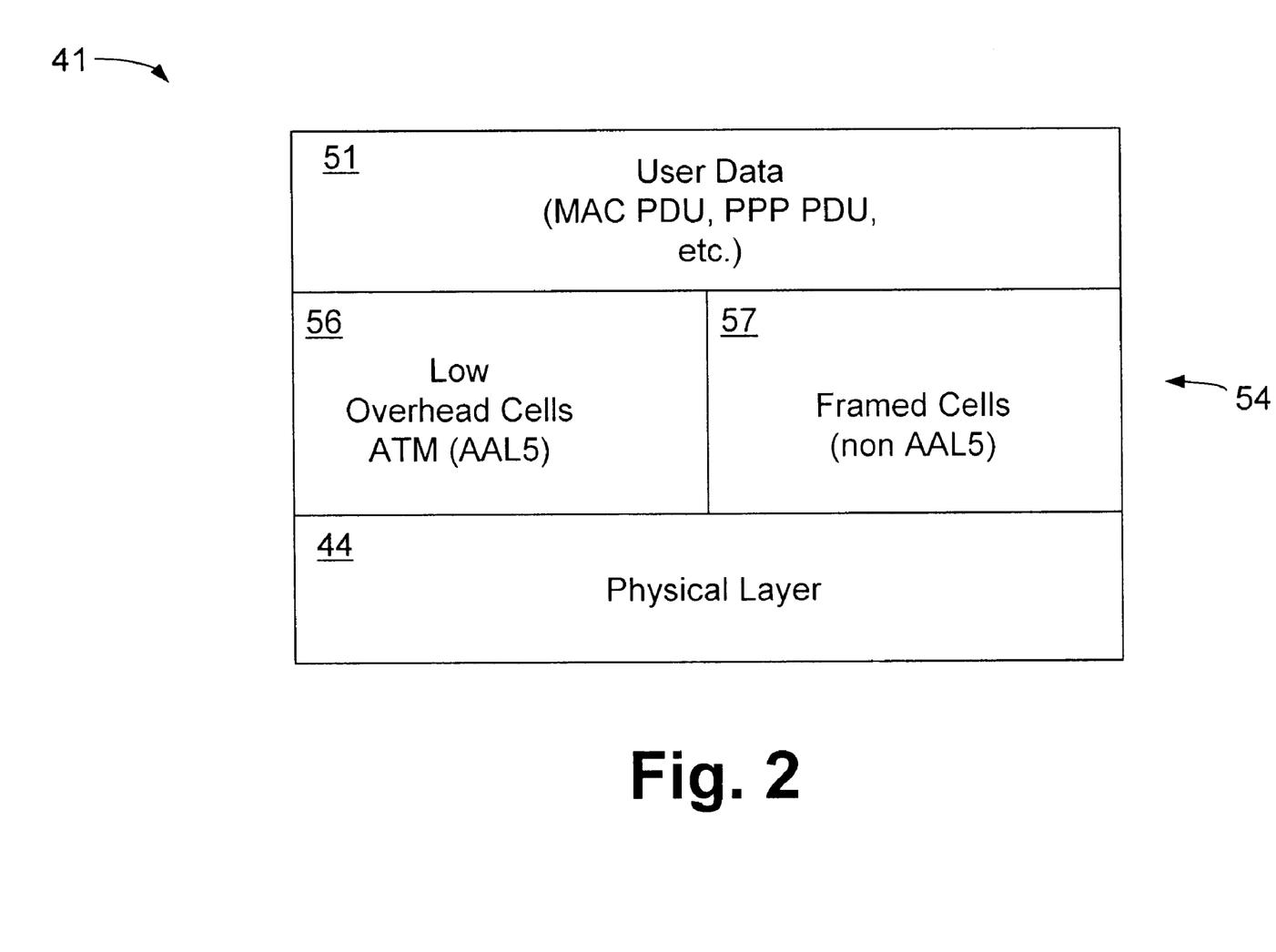
FIG. 2 is a schematic view illustrating two of the communication sublayers in which the present invention operates.

FIG. 2 is a schematic view illustrating a portion 41 of the communication sublayers in which the present invention operates. Illustratively, layer 1, or the physical layer 44 and layer 2, the data link layer, which includes ATM layer 54 and the user data PDU 51 are shown. Physical layer 44 consists of the low level physical connection including modulation, timing recovery, etc., over which remote transceiver 18 (FIG. 1) and central transceiver 14 (FIG. 1) communicate.

ATM Block 54 is divided to include low overhead cells block 56 and framed cells block 57 of the present invention. Block 57 contains framed cells, while block 56 contains the low overhead cells. AAL5 traffic is typically carried using the low-overhead cells of the present invention, while non-AAL5 traffic is carried using framed cells 57 of the present invention. Note also that it is possible to carry AAL5 traffic using framed cells 57. The operation of low overhead cells block 56 and framed cells block 57 will be described in detail with respect to FIGS. 4A and 4B below.

Figure 3A:
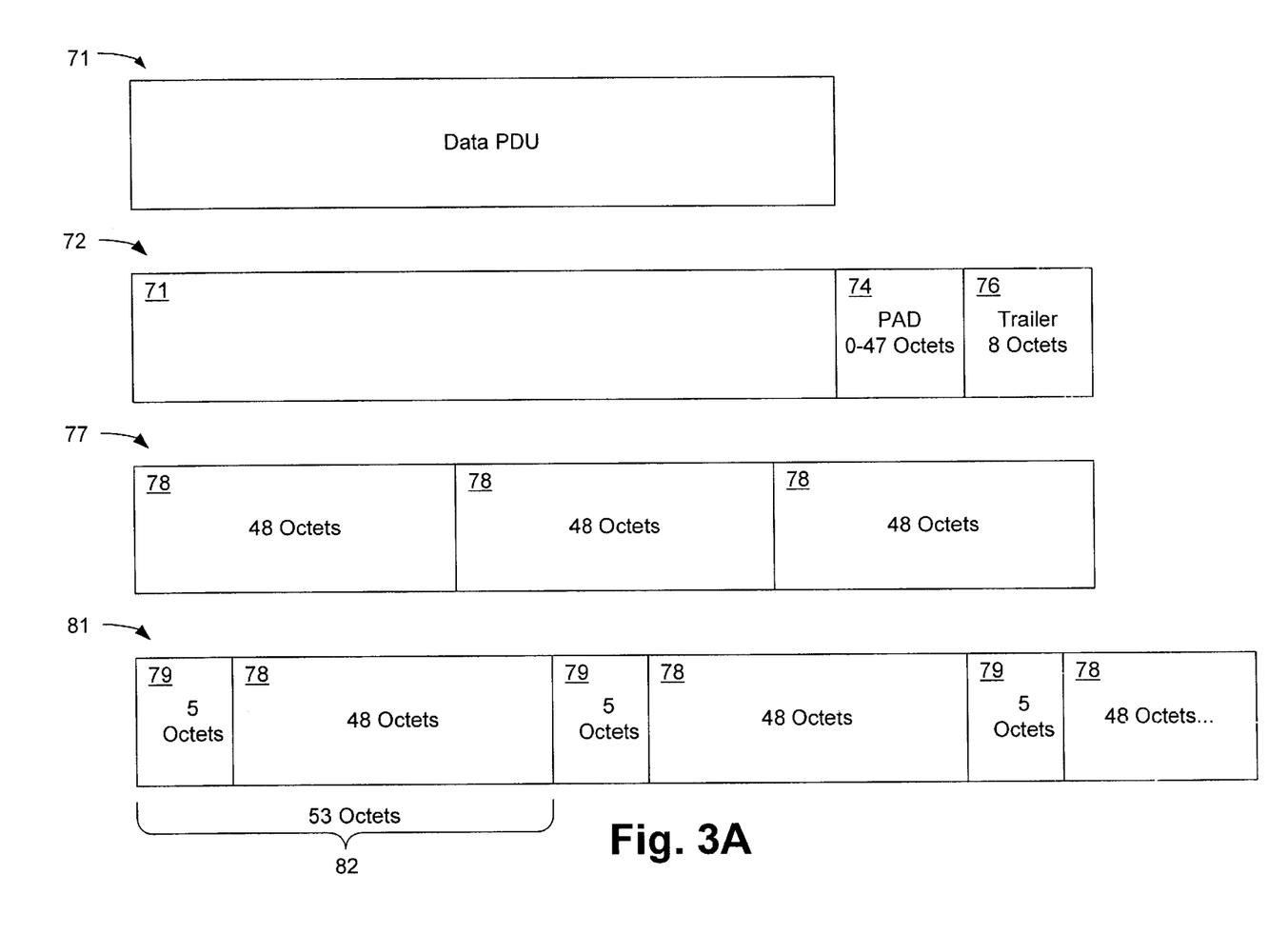
FIG. 3A is a schematic view illustrating the manner in which a standard ATM communication frame is developed.

FIG. 3A is a schematic view illustrating the manner in which a standard ATM communication frame 81 is developed. Data PDU 71, which is illustratively equivalent to data PDU 21 of FIG. 1, contains user data that is to be transported between computing device 17 and backend network 26 (FIG. 1) via remote transceiver 18 and central transceiver 14 (FIG. 1). Remote transceiver 18 performs a SAR (segmentation and reassembly) function as known to those skilled in the art. The SAR function is illustrated as follows.

Data PDU 71 may include, for example but not limited to, PPP frames, MAC frames, IP (Internet protocol) packets, real-time voice, real-time video, etc. View 72 illustrates data PDU 71 carried via AAL type 5, in which a pad 74 of 0–47 octets has been appended in order to produce a total frame size that is an even multiple of 48 octets. Also appended is an eight octet trailer 76, which (in the case of AAL5) includes a two octet length field, one UU (user-to-user) octet, one CPI (common part indicator) octet, and a four octet cyclic redundancy check (CRC) field.

As illustrated in view 77, the resulting frame 72 is then segmented into 48 octet cells 78 and in view 81, a five octet ATM header 79 is added to each 48 octet cell 78 in order to form the 53 octet ATM cell 82.

Figure 3B:
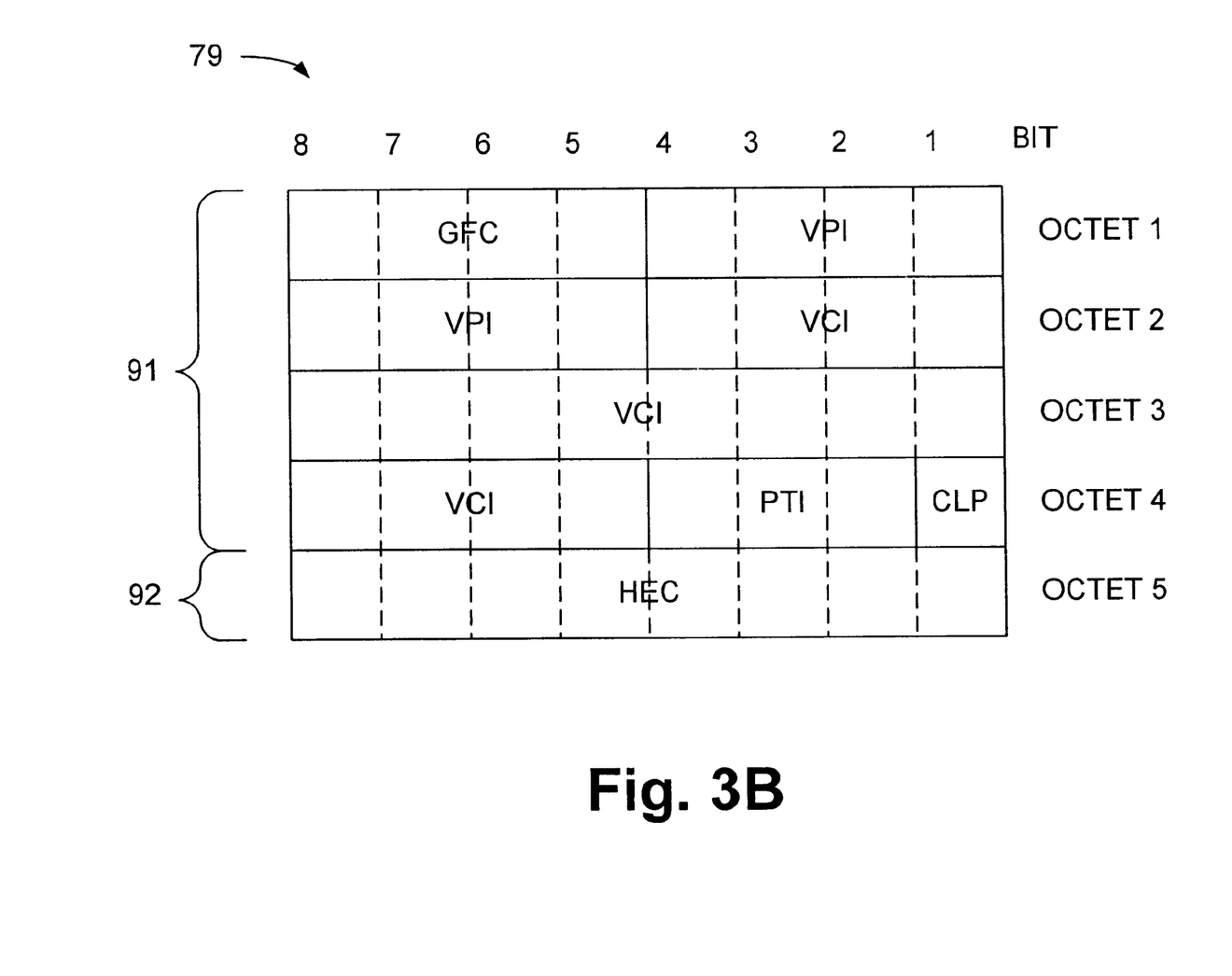
FIG. 3B is a schematic view illustrating an ATM header of the communication frame of FIG. 3A.

Referring now to FIG. 3B, ATM header 79 is comprised of four octets 91 containing generic flow control (GFC), virtual path identifier (VPI) and virtual channel identifier (VCI) switching information, payload type indicator (PTI), and cell loss priority (CLP). The fifth octet 92 is reserved for header error control (HEC). The HEC is an 8 bit field, and provides error detection for the entire cell header. As can be seen, each 48 octet cell 78 has a five octet header 79 prepended thereto. The foregoing describes a SAR function for the transfer of data in the direction of remote transceiver 18 toward central transceiver 14. In the opposing direction (i.e., from central transceiver 14 toward remote transceiver 18), the SAR function would be performed in the reverse order by remote transceiver 18. Central transceiver 14 would not perform the SAR function, but would instead pass the cells from subscriber line 16 to backend interface 27.

Figure 4A:
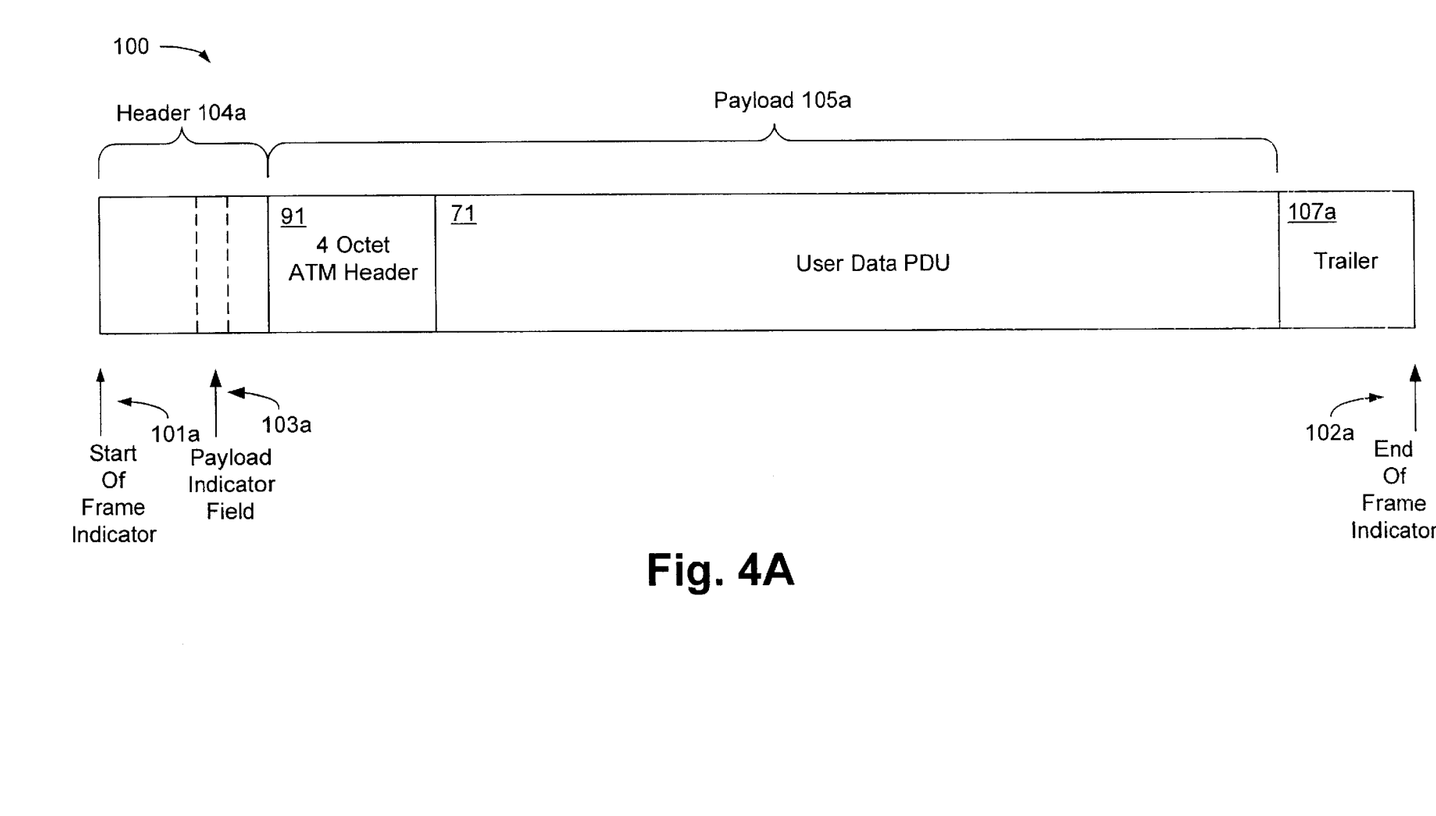
FIG. 4A is a schematic view illustrating a communication frame in accordance with the present invention.

FIG. 4A is a schematic view illustrating a low overhead cells communication frame 100 in accordance with the present invention. Low overhead cell frame 100 is illustratively bounded by start of frame indicator 101a and end of frame indicator 102a. These frame boundary indicators may be implemented by various methods including for example, high level data link control (HDLC) flags, carrier on and carrier off signals for half-duplex modulation, or other special physical layer (layer 1) indicators. Essentially, any physical layer (layer 1) or link layer (layer 2) indicator may be used to signal the beginning and end of frame 100.

Frame 100 includes payload 105a which consists of user data PDU 71 (FIG. 3A) to which is prepended a 4-octet ATM Header 91 (FIG. 3B). Header 104a may contain various fields, one of which is an indicator that the frame is a low overhead cells frame. 4-octet ATM Header 91 consists of the first four octets of a standard 5 octet ATM cell header (see header 79 in FIGS. 3A and 3B). In accordance with the concepts of the present invention, the fifth octet (92 of FIG. 3B) (HEC) has been removed from frame 100. Also appended to frame 100 is trailer 107a. Trailer 107a consists of a plurality of octets containing at least a frame check sequence (FCS). The FCS provides error detection over at least the Payload 105a. It may also include Header 104a in the error checking sequence. Alternately, Header 104a may have its own FCS, the FCS operating only over Header 104a. Header 104a also includes payload indicator field 103a, which field indicated whether a low overhead cells payload 105a, or whether a framed cells payload 105b (FIG. 4B) follows.

Low overhead cells frame 100 may be transported over subscriber line 16 via physical layer modulation between remote transceiver 18 and central transceiver 14. In accordance with the present invention, central transceiver 14 performs SAR functionality on the low overhead cells frame 100, which function is essentially similar to that described above with respect to FIG. 3B. In this manner, ATM cells may be transported to backend network 26 via backend interface 27. It is transparent to backend network 26 whether the SAR functionality was performed in remote transceiver 18 or in central transceiver 14.

Central transceiver 14 can implement the SAR function because all the information contained in Frame 72 of FIG. 3A is now available at the central transceiver 14. Special cases can be made for the UU and CPI fields contained in trailer 76. These fields can be carried in either Header 104a or Trailer 107a of FIG. 4A. Alternatively, these fields may not be present, in which case central transceiver 14 assumes that they are "0". Special fields in Header 104a can indicate the presence of the CPI and UU fields and also indicate whether they are contained in Header 104a or Trailer 107a.

By performing the SAR function at the central transceiver 14 instead of remote transceiver 18, less protocol overhead is carried on subscriber line 16. This can result in throughput increases of approximately 10% to 50%. Another benefit is that the complexity of remote transceiver 18 may be reduced, resulting in lower costs.

The above described method is useful for transporting data corresponding to AAL5. However, it may be desirable to transport other types of data (such as AAL1 or AAL2 data for voice, video, or other real-time information). Furthermore, on occasion, AAL5 data may carry non AAL5 information, such as OAM (operation and maintenance) cells, RM (resource management) cells, etc. In these, or similar, instances SAR functionality may be performed in remote transceiver 18 or even in program 13 (FIG. 1), thus allowing the ATM transport to be used for these occasions. The foregoing is accomplished by using framed cells to be carried over subscriber line 16.

Figure 4B:
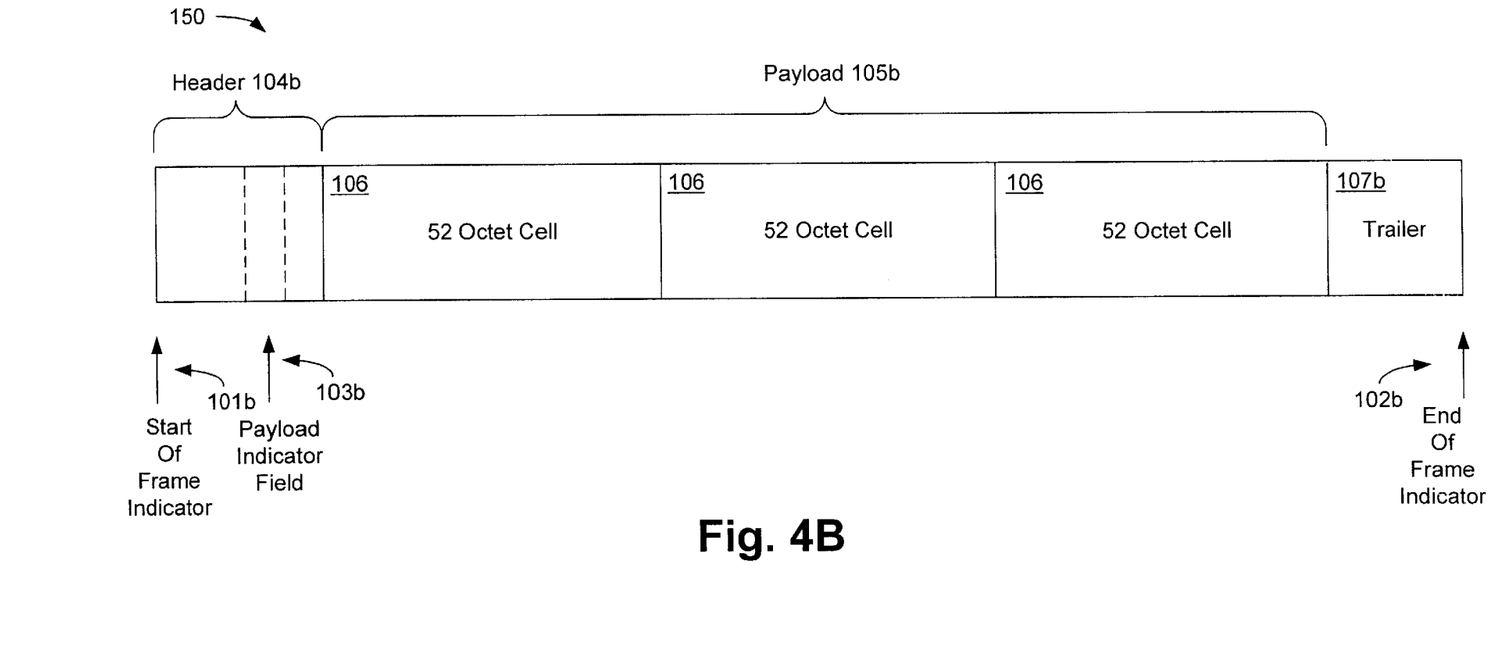
FIG. 4B is a schematic view illustrating an alternative communication frame in accordance with the present invention.

FIG. 4B is a schematic view illustrating an alternative communication frame 150 in accordance with the present invention. The alternative communication frame 150 allows the transport of framed cells. Framed cells allow ATM cells to be carried in a data frame. Frame 150 includes one or a plurality of 52-octet ATM cells 106 to which is added header 104b and trailer 107b. Header 104b contains payload indicator field 103b, which field indicates that the payload 105b is framed cells. Trailer 107b may provide a frame check sequence (FCS) for all the 52 octet cells 106. Because of this, the HEC octet (present in the header 79 of each 53 octet cell 82 as described with respect to FIG. 3A) may be removed resulting in 52 octet cells 106. 52 octet cells 106 offer the advantage of slightly less overhead then 53 octet cells. Also, 52 octet cells consist of an integral number (13) of 32-bit words. As those skilled in the art of programming can appreciate, information that conforms to word boundaries results in more efficient processing.

Because frame 100 and frame 150 possess the same basic structure, they may be intermingled on the same subscriber line 16. Payload indicator fields 103a and 103b of Header 104a and header 104b, respectively, indicate the type of payload 105a (low overhead cells) or 105b (framed cells).

FIGS. 5A, 5B and 5C collectively are flow charts that illustrate the present invention. These flow charts illustrate the invention in the direction of data flow from the remote transceiver 18 to the central transceiver 14. Those skilled in the art will recognize that data flow may also occur in the direction from the central transceiver 14 to the remote transceiver 18.

Turning now to FIG. 5A, shown is a flow chart 200 illustrating the steps performed at the remote transceiver 18 to implement the improved system and method for transporting information over a communication channel.

In blocks 201 and 202, the remote transceiver 18 receives the Data PDU 21 and ATM information field 22 from the Computing Device 17 (FIG. 1), respectively.

In block 204, the ATM information field 22 is tested. If the test indicates AAL5 data, then low overhead cell processing is done beginning with block 206. If the test indicates non-AAL5 data, then framed cell processing is done beginning with block 209.

In block 209, a header 104b is formed. Part of this header is a field that indicates the payload type. For block 209, the payload type is framed cells.

In block 211, AAL processing is performed on the Data PDU 21 of FIG. 1. This processing is different depending on the AAL type. Block 211 will form 52 octet cells 106.

In block 212, a frame (150 of FIG. 4B) is completed by adding the trailer 107b and the frame delimiters (101b and 102b, respectively). Creation of a frame check sequence (FCS) is part of this trailer processing.

In block 214, the fully formed frame 150 is transmitted over the subscriber line 16 to the central transceiver 18.

Turning now to the low overhead cells processing of block 206, a header (104a of FIG. 4A) is formed. One field (103a) in this header indicates that the payload type is low overhead cells (105a).

In block 207, information found in the ATM information field 22 of FIG. 1 is used to form the 4-octet ATM header (91 of FIG. 4A). This information may include the GFC, VPI, VCI, PTI and CLP fields referenced in FIG. 3B.

In block 208, the data PDU 21 of FIG. 1 is appended to the 4-octet ATM header 91 to form the payload 105a. This information is then passed to block 212, which has been described above.

Turning now to FIG. 5B, shown is a flow chart 220 illustrating the steps performed at the central transceiver 14 to implement the improved system and method for transporting information over a communication channel.

In block 221, the central transceiver 14 receives a frame from the remote transceiver 18 over the subscriber line 16. An FCS check is performed on the frame, as shown in block 222. If the frame is in error, it will be discarded, as shown in block 224. If the frame is correct, it will be processed in block 226.

In block 226, the payload indicator field of the header is tested. If this field indicates low overhead cells (as in FIG. 4A), then the processing is performed beginning with block 227. If the payload indicator field indicates framed cells (as in FIG. 4B), then processing begins with block 228.

In block 228, the cells are extracted, a HEC (see 92 of FIG. 3B) is added to each 4 octet ATM header and the resulting 53-octet cells are output to the backend interface (27 of FIG. 1) as shown in block 229.

Turning now to block 227, the low overhead cell payload (105a of FIG. 4A) is placed into an AAL5 SAR function prior to being output as cells to the backend interface 27 of FIG. 1 as shown in block 229. The AAL5 SAR function is shown in FIG. 5C.

FIG. 5C is a flow chart 230 illustrating the steps performed at the central transceiver 14 to implement the SAR process of the improved system and method for transporting information over a communication channel.

In block 231, the payload (105a of FIG. 4A) is processed from the frame 100. The number of octets of the user data PDU 71 of the payload is counted in block 232. This value forms the length field of the AAL5 CS. Note that the user data PDU 71 is the field found after the 4-octet ATM header field 91 of FIG. 4A. Block 234 forms the UU and CPI fields of the AAL5 frame. For the case where the UU and CPI field are not included in the header or trailer, the default "0" is used. Block 236 adds pad characters to make the AAL5 frame equal an integer number of 48 octet cells. In block 237, the 32 bit cyclic redundancy check (CRC) of the AAL5 frame is calculated. Block 238 segments the above AAL5 frame into an integer number of 48 octet cells.

In block 239, the 4-octet ATM header 91 from the payload 105a is extracted. In block 241, a HEC (92 of FIG. 3B) is added to the 4-octet ATM header 91 to form a 5-octet ATM header. Block 242 shows the 5-octet ATM header prepended to the 48-octet cells formed in block 238.

Block 244 illustrates the AAL5 processing whereby the last cell in the frame is indicated in the Payload Type Indicator (PTI) of the 53-octet ATM cell header.

Many variations and modifications may be made to the above-described embodiment(s) of the invention without departing substantially from the scope and principles of the invention. All such modifications and variations are intended to be included herein within the scope of the present invention.

Therefore, having thus described the invention, at least the following is claimed:

1. An improved system for communicating over a digital subscriber line, comprising:

means for forming a data frame, said data frame comprising:
   a frame header;
   a frame trailer;
   a first frame delimiter that indicates the start of said data frame;
   a second frame delimiter that indicates the end of said data frame, said first and second frame delimiters encompassing a plurality of fields; and
   a payload comprising a four-octet payload header and user data, said four-octet payload header comprising the first four octets of a five octet Asynchronous Transfer Mode (ATM) header, said frame header comprising a field that indicates that said payload includes a four-octet payload header followed by user data; and
   means for transmitting said data frame over said digital subscriber line.

2. The system as defined in claim 1, wherein said frame trailer provides a frame check sequence (FCS) over all of said plurality of fields between said first frame delimiter and said second frame delimiter.

3. The system as defined in claim 1, wherein said frame trailer provides a frame check sequence (FCS) over said payload, whereby said frame header contains an FCS.

4. The system as defined in claim 1, wherein said frame delimiters are HDLC flags.

5. The system as defined in claim 1, wherein said frame delimiters are physical layer carrier switching ON for start of frame and physical layer carrier switching OFF for end of frame.

6. An improved method for communicating over a digital subscriber line, comprising the steps of:

forming a data frame, said data frame comprising:
   a frame header;
   a frame trailer;
   a first frame delimiter that indicates the start of said data frame;
   a second frame delimiter that indicates the end of said data frame, said first and second frame delimiters encompassing a plurality of fields; and
   a payload comprising a four-octet payload header and user data, said four-octet payload header comprising the first four octets of a five octet Asynchronous Transfer Mode (ATM) header, said frame header comprising a field that indicates that said payload includes a four-octet payload header followed by user data; and
   transmitting said data frame over said digital subscriber line.

7. The method as defined claim 6, in wherein said frame trailer provides a frame check sequence (FCS) over all of said plurality of fields between said first frame delimiter and said second frame delimiter.

8. The method as defined in claim 6, wherein said frame trailer provides a frame check sequence (FCS) over said payload, whereby said frame header contains an FCS.

9. The method as defined in claim 6, wherein said frame delimiters are HDLC flags.

10. The method as defined in claim 6, wherein said frame delimiters are physical layer carrier switching ON for start of frame and physical layer carrier switching OFF for end of frame.

11. An improved system for communicating over a digital subscriber line, comprising:

means for forming a data frame, said data frame comprising:
    a frame header;
    a frame trailer;
    a plurality of frame delimiters; and
    a payload comprising at least one 52-octet ATM cell, said 52-octet ATM cell consisting of a 53-octet ATM cell with the header error control (HEC) octet removed, said frame header comprising a field that indicates that said payload includes at least one 52-octet ATM cell; and
    means for transmitting said data frame over said digital subscriber line.

12. The system as defined in claim 11, wherein said frame trailer provides a frame check sequence (FCS) over all fields between said frame delimiters.

13. The system as defined in claim 11, wherein said frame trailer provides a frame check sequence (FCS) over said payload only, said frame header containing an FCS.

14. An improved method for communicating over a digital subscriber line, the method comprising the steps of:

forming a data frame, said step of forming a data frame comprising the steps of:
    forming a frame header;
    forming a frame trailer;
    forming a plurality of frame delimiters; and
    forming a payload comprising at least one 52-octet ATM cell, said 52-octet ATM cell consisting of a 53-octet ATM cell with the HEC octet removed, said frame header comprising a field that indicates that said payload includes at least one 52-octet ATM cell; and
    transmitting said data frame over said digital subscriber line.

15. The method as defined in claim 14, wherein said frame trailer provides a frame check sequence (FCS) over all fields between said frame delimiters.

16. The method as defined in claim 14, wherein said frame trailer provides a frame check sequence (FCS) over said payload only, said header containing an FCS.

* * * * *